Figure 1:
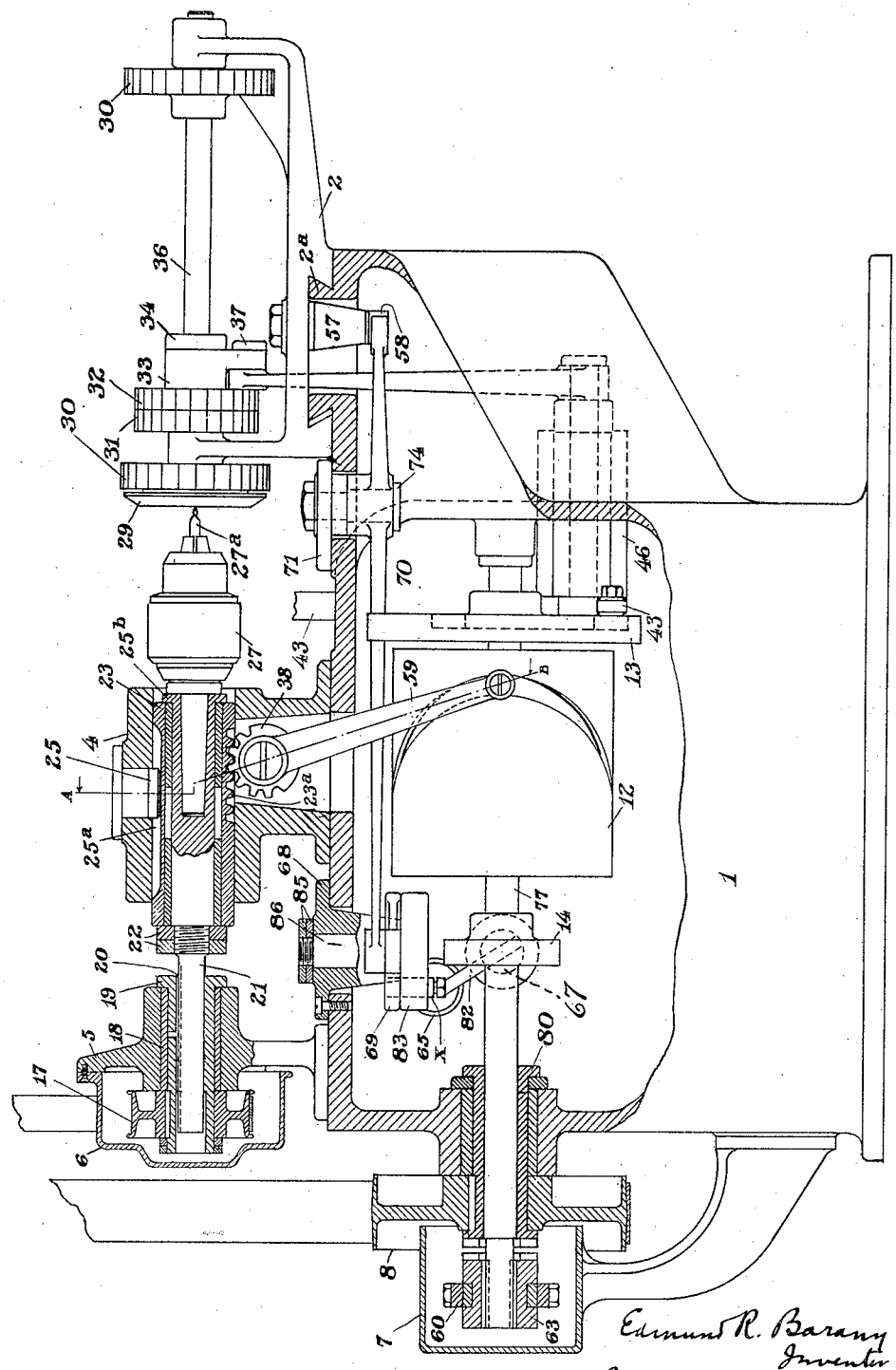

E. R. BARANY.
AUTOMATIC DRILLING MACHINE.
APPLICATION FILED OCT. 8, 1918.

1,384,585.

Patented July 12, 1921.
7 SHEETS—SHEET 1.

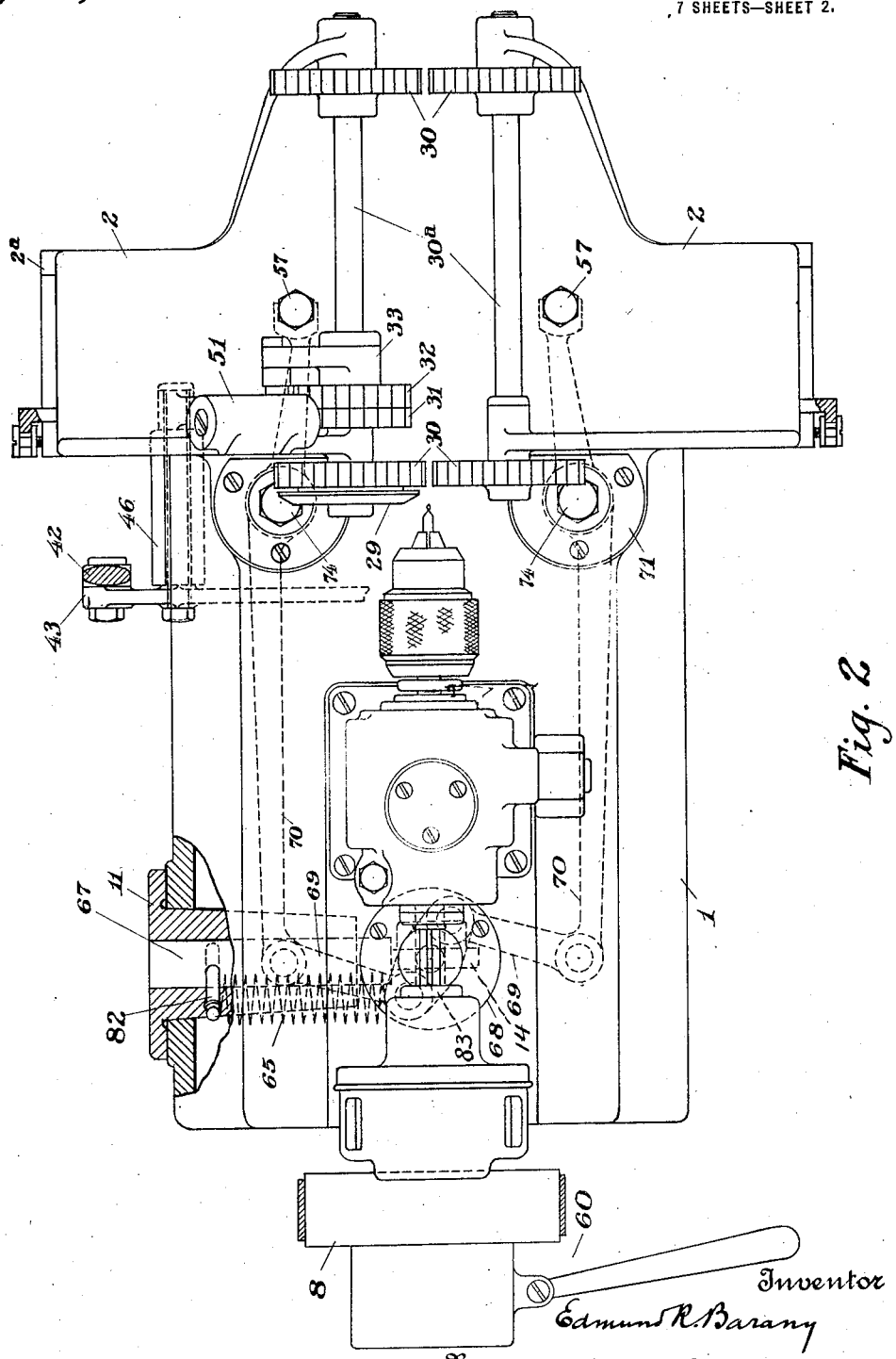

E. R. BARANY.
AUTOMATIC DRILLING MACHINE.
APPLICATION FILED OCT. 8, 1918.
1,384,585.
Patented July 12, 1921.
7 SHEETS—SHEET 3.
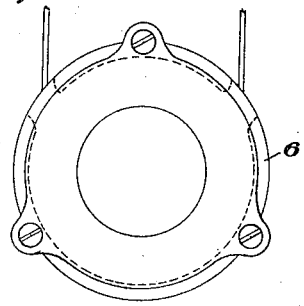
Fig. 5
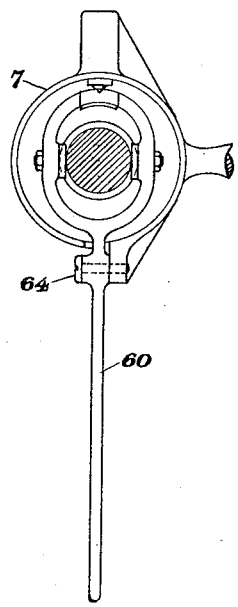
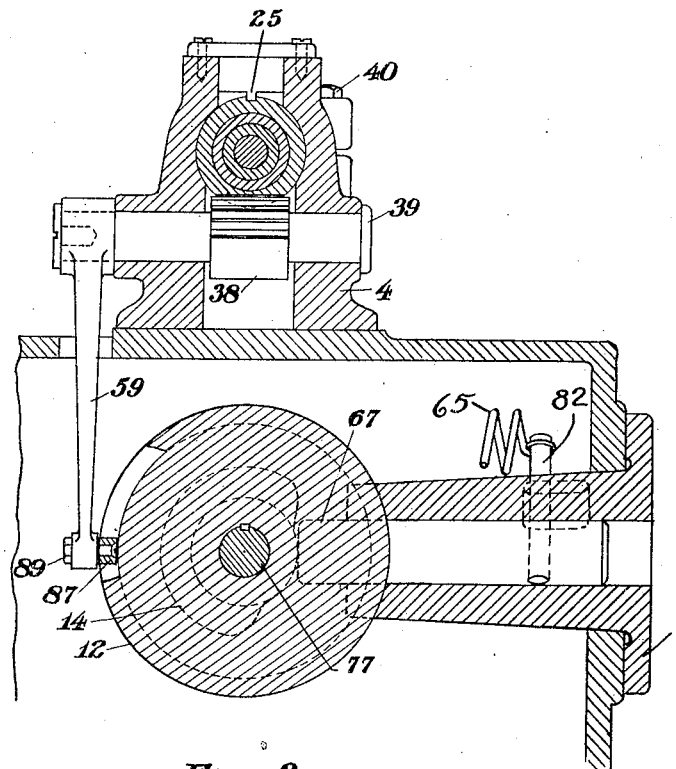
Fig. 4
Fig. 3
Inventor
Edmund R. Barany
By John A. Bommhardt
Attorney

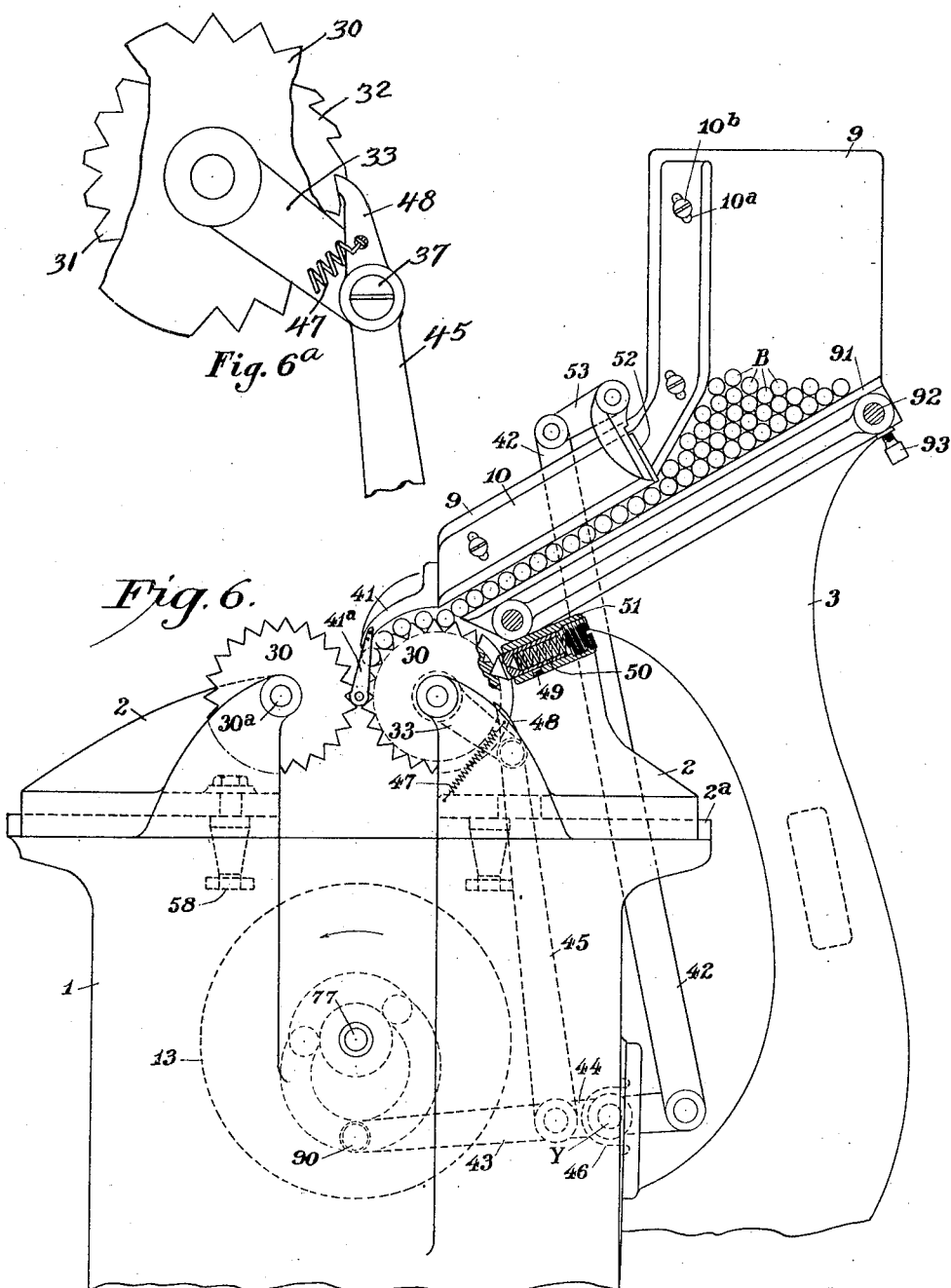

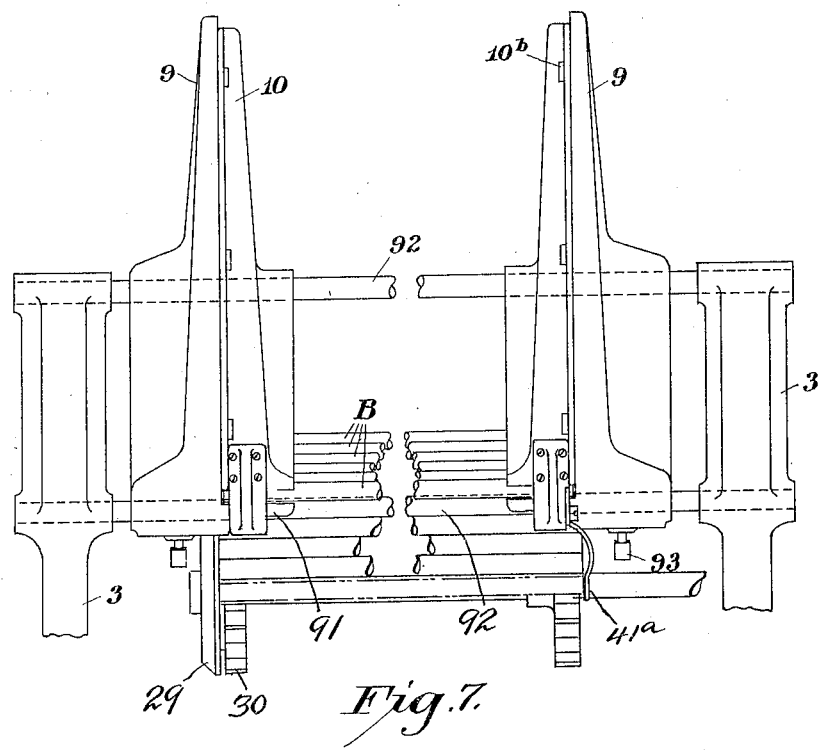
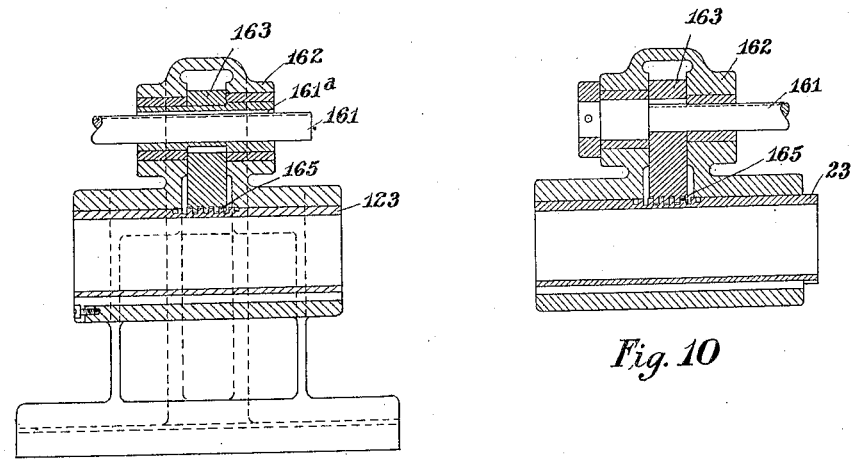

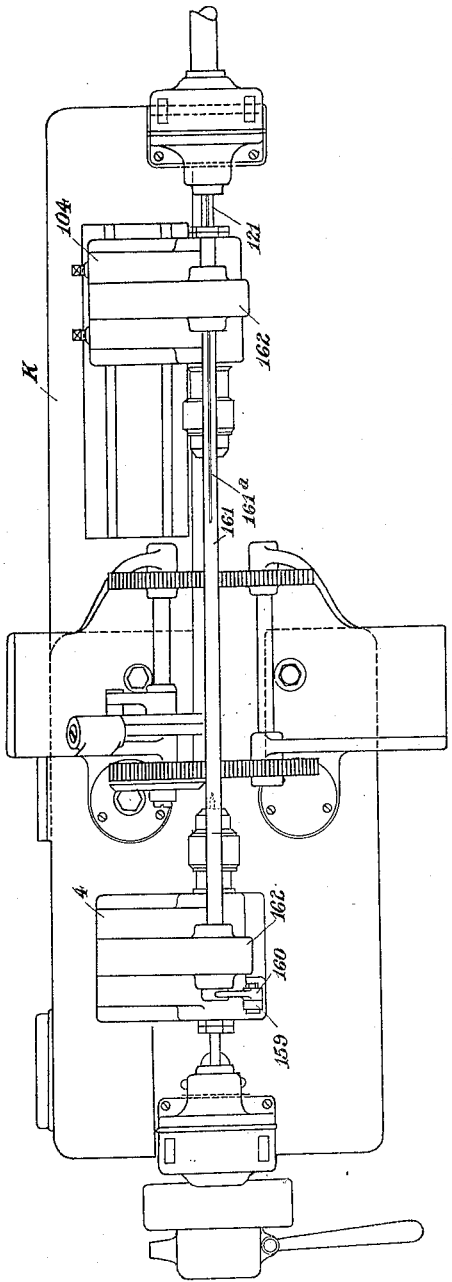

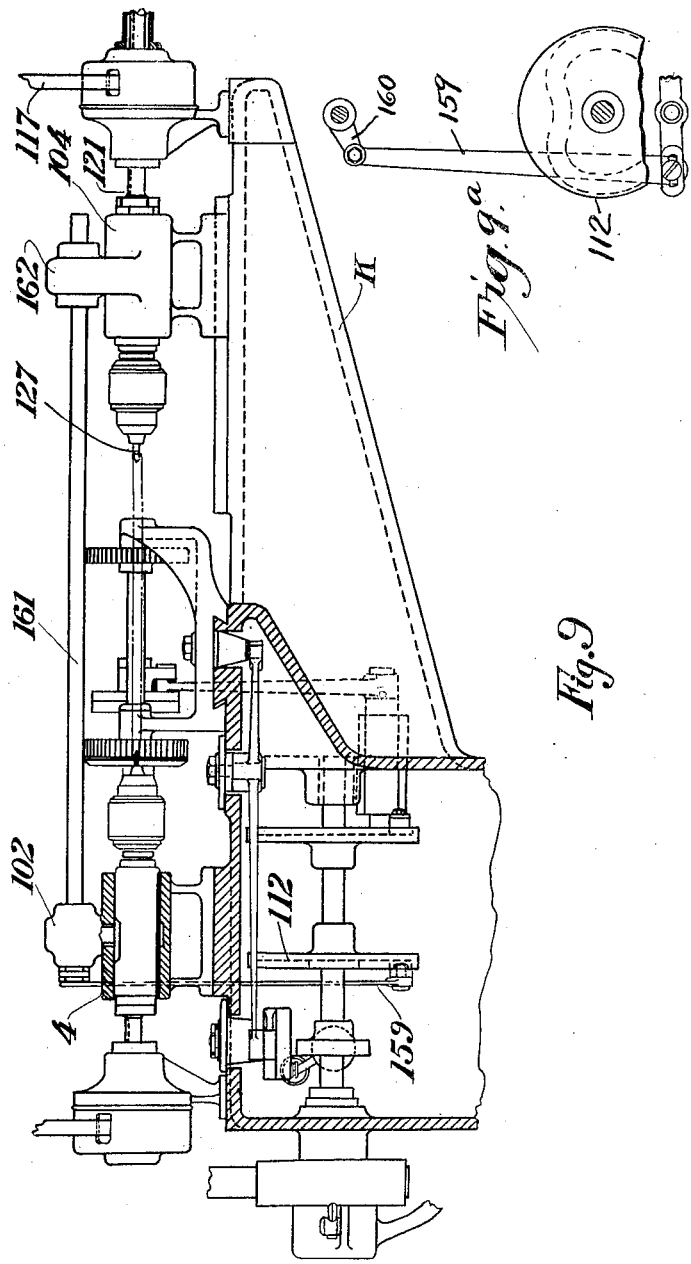

UNITED STATES PATENT OFFICE.

EDMUND R. BARANY, OF NEW YORK, N. Y., ASSIGNOR TO TWINOMATIC MACHINE AND TOOL CO. INC., OF BROOKLYN, NEW YORK, A CORPORATION OF NEW YORK.

AUTOMATIC DRILLING-MACHINE.

1,384,585.      Specification of Letters Patent.      Patented July 12, 1921.

Application filed October 8, 1918. Serial No. 257,333.

*To all whom it may concern:*

Be it known that I, EDMUND R. BARANY, a citizen of the United States, residing at New York city, in the county of New York and State of New York, have invented certain new and useful Improvements in Automatic Drilling-Machines, of which the following is a specification.

This invention comprises an automatic drilling machine in which blanks, such, for example, as small spindle or shaft sections, are fed to centering and clamping devices by which they are centered, indexed and clamped, and while so held are drilled at the ends, the action of the drill being automatic. The machine therefore includes a feeding mechanism, an indexing and clamping mechanism, and a drilling mechanism including means to advance and retract the drill in time with the movements of the blanks, to drill the blanks in succession as they are centered in drilling position. The feeding and controlling mechanisms are conveniently operated or timed by cam devices. After one blank is drilled it is dropped and another blank takes its place for the next operation, the actions being entirely automatic and the machine requiring only the supply of blanks to the feeding magazine. Novelty will be especially apparent with respect to the means for advancing and retracting the drill, for indexing and clamping the blanks, and for coördinating the various movements.

The invention is embodied in a machine for drilling one end of the blanks, and, as a modification, may also be embodied in a machine for drilling both ends of each blank, the former being entitled the one spindle machine and the latter the two spindle machine.

The invention is illustrated in the accompanying drawing in which Figure 1 is a vertical longitudinal section of the one-spindle machine. Fig. 2 is a top plan view. Fig. 3 is a section on the line A—B of Fig. 1. Fig. 4 is a detail of a clutch operating device. Fig. 5 is a detail of the end of the drill spindle mount. In Figs. 1, 2 and 3 the feeding mechanism is not shown. Fig. 6 is an end elevation of the machine, partly in section, showing the feeding mechanism. Fig. 6$^a$ is a detail of the feeding devices. Fig. 7 is a detail in front elevation of the feeding device. Fig. 8 is a plan of the two spindle machine. Fig. 9 is a side elevation thereof. Fig. 9$^a$ is a detail of the spindle operating devices. Fig. 10 is a section on the line 10—10 of Fig. 8 and Fig. 11 is a section on the line 11—11 of Fig. 8.

In the drawings, 1 indicates the frame or bed of the machine, of suitable size and formation to support the parts to be hereinafter described. 77 is a cam shaft supported in suitable bearings under the top of the frame, and this shaft is driven by a belt applied to a pulley 8 which is keyed to a clutch sleeve 80, the outer end of which coöperates with a clutch member 63 which is splined to the shaft 77 and may be operated by a shifting lever 60. The cover 7 incloses the clutch. The shaft 77 carries cams to be hereinafter described.

The drill spindle 21 is mounted to rotate and reciprocate in a bracket 4 on top of the frame. This spindle is driven by a pulley 17 keyed to a sleeve 19 which is splined as indicated at 20, to the spindle 21, and the sleeve slides in a bearing 18 in a bracket 5 fixed to the frame. 6 is a cover for the pulley. The spline permits longitudinal movement of the spindle. At its front end the spindle carries a standard chuck 27 for the drill 27$^a$. On rotation of the pulley the drill is driven at relatively high speed.

The drill spindle is advanced and retracted by means of a drum cam 12 on the cam shaft 77. The groove of this cam engages a roller on the end of a lever 59 which is fixed to a rock shaft 39 which extends transversely through the bracket 4 and is provided with a segmental pinion 38 which meshes with a rack 23$^a$ in a sleeve 23 in which the spindle 21 turns. The sleeve carrying the spindle is mounted to slide lengthwise in the bracket 4 and rotation of the sleeve is prevented by a key 25 engaging in a long key way 25$^a$ in the sleeve, the spindle being confined in the sleeve by a shoulder 25$^b$ at one end and lock nuts 22 at the other. The cam 12, therefore, through the lever 59 and the connected parts, will advance and retract the drill spindle as it rotates, and the drill will bore a hole in the end of the blank and then retract therefrom.

The clamping mechanism, for holding the successive blanks as they are being drilled, comprises two pairs of notched wheels 30, between which the blanks are fed and by which they are held while being drilled. These wheels are mounted on a pair of shafts 30ª which are carried on a pair of slides 2 which move toward and from each other, being mounted on slide-ways or guides 2ª on the top of the frame. A pin 82 projects from the plunger 67 and is connected to one end of a coiled spring 65, the other end of which is connected to a stud x on an oscillating crank disk 83, the pivot stem or stud 86 of which turns on a bearing 68 fixed to the frame, the stud being supported by lock nuts 85. The disk 83 forms a double crank, being connected by links 69 to a pair of levers 70 which are fulcrumed on studs 74 supported in bearings 71 in the bed. The outer ends of the lever 70 are forked around rollers 58 carried by depending studs 57 fixed to the slides 2 respectively. As the levers are vibrated, the slides 2 are moved toward and from each other. It will be noticed that the spring 65 holds the plunger 67 against the edge of the cam 14. As the rise of the cam passes the plunger 67, said plunger is forced outwardly and the spring 65 pulls the wrist plate 83 in a direction to advance the slides 2 and, accordingly, the two pairs of disks 30 toward each other, at which time the blank will have been fed between said disks and the blank is thereby held while it is being drilled. The action is timed to correspond with the advance of the drill. After the drilling operation is completed, the cam 14 runs off the plunger 67 which is then retracted by the spring and the clamping disks release the blank just drilled. It is to be noted that the spring 65 controls the amount of pressure applied by the clamping disks 30 to the blank, and will yield to prevent excessive pressure and may be changed to vary the pressure. When plunger 67 is pushed out by cam 14, it increases the tension on spring 65 and turns disk 83 so as to throw the levers 70 out and disks 30 in, but when the plunger 67 reaches the depression in the cam 14, the plunger moves in and disk 83 will remain stationary, because there is always a certain amount of tension on spring 65, but considerable less than when it is under full tension. Therefore, levers 70 will remain in position until indexing occurs and a new blank comes into position and acts as an intermediate gear or gag between the opposed clamping disks. If there is not enough space for the new bar to fit into position, the interference between the new blank and the opposed clamping disks will automatically push the slides out whatever amount may be necessary. This is possible, because the plunger 67 is on a low step on cam 14 and spring 65 has considerable less tension.

To lock and index the blanks, as they are fed to the clamping disks, I provide a notched locking disk 31, to hold the blank being drilled in center position, and a toothed indexing or ratchet disk 32. These disks are mounted on one of the shafts 30ª. The edge of the disk 31 has notches adapted to be engaged by the pointed end of a spring indexing pin 50 held in line by a teat screw 49 in a tubular guide bracket 51 on the slide 2, and as the locking disk is turned with the shaft 30ª, the spring pin 50 slips out of one notch and snaps into the next to prevent overthrow and to hold the blank in exact centered position during drilling. The indexing disk 32 has ratchet teeth engaged by a pawl 48 held thereto by spring 47 and carried at the upper end of a rod 45 connected to a crank arm 44 projecting from the rock shaft Y which turns in bearings 46 on the frame and is fixed to a lever 43 the inner end of which carries a roller 90 which travels in a groove in a face cam 13 fixed to the cam shaft 77. As the cam rotates, the shaft Y is rocked and the pawl 48 and its rod 45 are lifted and dropped to turn the wheel 32 step by step to feed the blanks to the drilling position. The yoke 33, swinging on the shaft 30ª, holds the pawl 48 to its work.

The feeding mechanism is shown in Figs. 6 and 7 and acts to feed the blanks B from the magazine to the clamping disks 30. The magazine is supported by bracket arms 3 on the end of the frame and comprises a pair of side plates 9 with bottom flanges 91 on which the ends of the blanks rest, and on which they roll. A shoe 10 is attached to the inner face of each side plate and acts to confine the blanks to a single row as they feed down. These shoes are adjustable by slots 10ª and screws 10ᵇ to accommodate blanks of different diameters. The side plates 9 are adjustably mounted on rods 92 supported by the bracket 3 and may be set in or out to accommodate blanks of different lengths, and fastened by set screws 93 to the respective rods. 52 is a shaker plate in the magazine, to agitate the blanks and arrange them straight and in order. It is mounted on a shaft having an arm 53 connected by a link 42 to the projecting outer end of the lever 43, which, as stated above, is vibrated by the face cam 13, and as the lever is vibrated the shaker plate 52 oscillates to arrange the blanks in order. The runway of the magazine directs the blanks to and upon one pair of clamping disks the notches of which pick up the blanks and carry them around to clamping position as the feed mechanism is actuated. 41 are a pair of guards at opposite sides of the magazine to confine the blanks to the clamping disks, and one of these guards has fixed thereto a light, flat spring 41ª which moves or presses the blanks endwise against a stop disk 29 mounted on the inner end of the shaft 30ª and acts to keep the stock at the proper distance from the drill. Thus, the inner ends of the blanks will be forced by the spring against the side face of the stop disk, to line them up at an exact distance with respect to the drill.

The particular operation will be evident from the above description. Speaking generally, the blanks are fed from the magazine to the clamping disks and as these are turned the blanks are carried around to center positions, the disks at this movement being retracted or separated slightly, by the action of the slides 2, so that the blanks are free to be exactly indexed and positioned. As each blank reaches the drilling center, the slides 2 move toward each other and the center blank is clamped between the two pairs of disks where it dwells. At the same time, the rotating spindle is advanced by means of the cam 12 and the connections thereto, and a hole is drilled in the end of the blank. The spindle then retracts, the clamping disks are released and turned, the drilled blank is dropped, the next blank is brought to center position, and the operation is repeated. In the two-spindle machine, for drilling both ends of the blanks, the construction is the same, except in certain particulars shown in Figs. 8 to 11, and now to be described. The spindle of the second drill 127 is carried in bracket 104 adjustable lengthwise along a supporting arm K projecting from the frame of the machine, the spindle 121 being driven by belt 117 and suitable pulley similar to the drive of the other spindle. For advancing and retracting both spindles a face cam 112 is substituted for the drum cam 12, and the cam actuates a transversely vibrating lever 159 which is connected to an arm 160 on the end of a long rock shaft 161 which is mounted in bearing boxes 162 upon the bracket heads 4 and 104 which carry the drill spindles. Spirally segmented gears 163 are carried by the shaft 161, the shaft having a spline 161ª to permit the adjustment of the head 104. The spirally segmented gears 163 mesh with spiral, rack teeth 165 in the sleeves 23 and 123 in which the respective spindles turn. By this arrangement, when the shaft 161 is rocked by the cam 112, the spiral segments 163 (which are respectively right and left hand) act upon the spiral teeth 165 to produce a simultaneous advance and retraction of the sleeves 23 and 123 and the drill spindles carried thereby, in opposite directions, this action of course being timed with the indexing and clamping of the blanks between the two spindles and both ends of each blank are accordingly drilled by the oppositely acting drills.

The invention is not limited to the particular structure shown and described, but various modifications are possible within the scope of the following claims.

I claim:

1. In a drilling machine, the combination with a drill spindle, and means to advance and retract the same axially, of a pair of slides at opposite sides of the axial line of the drill, and movable toward and from each other, a rotary blank clamping member carried by each of the slides, and means to reciprocate said slides, to center and clamp a blank in line with the drill.

2. In a drilling machine, the combination of a frame having a top bed, a drill spindle reciprocably mounted above said bed, means to reciprocate said spindle axially, a pair of reciprocating slides mounted on said bed, at opposite sides of the axial line of the drill, means to reciprocate said slides, and rotary blank clamping members carried by the slides.

3. A blank holding mechanism comprising a pair of notched wheels adapted to engage a blank therebetween, means to intermittently rotate the wheels, and means to advance and retract the wheels toward and from each other, to clamp and release the blank.

4. A blank holding mechanism comprising, in combination, a pair of slides movable toward and from each other, a pair of notched wheels carried by the slides respectively and adapted to hold a blank in the notches therebetween, means to turn the wheels step by step and means to move the slides.

5. A blank feeding and holding mechanism comprising in combination a pair of notched feeding and clamping wheels between which the blank is held, means to turn one of said wheels step by step, a notched locking wheel connected to the last mentioned wheel, and a spring pin having a beveled end engaging successively the notches in said locking wheel.

6. A blank feeding and holding mechanism comprising, in combination, a pair of parallel shafts, a notched clamping wheel on each shaft, a notched locking wheel upon one of the shafts, a spring pin having a beveled end engaging successively in the notches in said locking wheel, a ratchet wheel on said shaft, and a pawl mechanism engaging the ratchet wheel to turn the shaft.

7. In a blank feeding and holding mechanism, the combination of a pair of slides, means to move the same toward and from each other, a notched wheel carried by each slide and coöperating to clamp a blank therebetween when the slides are advanced, and means to turn said wheels step by step while the slides are retracted.

8. In a blank feeding and holding mechanism, the combination of a pair of slides, means to move the same toward and from each other, a notched wheel carried by each slide and coöperating to clamp a blank therebetween when the slides are advanced, and means to turn said wheels step by step while the slides are retracted, and means to hold said wheels in fixed position when the slides are advanced.

9. A blank feeding and holding mechanism, comprising, in combination, a pair of shafts, a notched wheel on each shaft, arranged to carry and clamp a blank therebetween, a stop disk on one shaft, and means to shift a blank lengthwise against said disk to properly position the same.

10. In a blank feeding and holding mechanism, the combination of a notched wheel to which the blanks are supplied, means to turn said wheel step by step, a coöperating clamp member opposite said wheel, and means to remove said wheel toward and from said member to clamp or release the blanks carried in said notches successively.

11. In a blank feeding and holding mechanism, the combination of a pair of slides, means to move the same toward and from each other, a notched wheel carried by each slide and coöperating to clamp a blank therebetween when the slides are advanced, means to turn said wheels step-by-step while the slides are retracted, and means for furnishing a continuous supply of blanks to one of the said wheels.

12. In a machine for shaping articles, including a tool, intermittently operating means comprising a pair of opposed clamping members for advancing and holding articles in the center line of said tool, a fixed pivot, and spring controlled means turning on said pivot for retracting and advancing said members to exactly the same extent relative to said center line each operation of said machine.

13. In a machine for shaping articles including a tool, intermittently operating means comprising a pair of opposed clamping members for advancing and holding articles in the center line of said tool, means for retracting said members and means controlled by a single spring for advancing said members to exactly the same extent relative to said center line each operation of said machine.

In testimony whereof, I do affix my signature.

EDMUND R. BARANY.